United States Patent
Leterrier et al.

(10) Patent No.: US 11,850,926 B2
(45) Date of Patent: Dec. 26, 2023

(54) MOTOR VEHICLE OPENING PANEL PROVIDED WITH AN EQUIPMENT SUPPORT PLATE AND A REMOVABLE SKIN

(71) Applicant: Compagnie Plastic Omnium SE, Lyons (FR)

(72) Inventors: Franck Leterrier, Sainte-Julie (FR); Philippe Coudron, Sainte-Julie (FR)

(73) Assignee: COMPAGNIE PLASTIC OMNIUM SE

( * ) Notice: Subject to any disclaimer, the term of this patent is extended or adjusted under 35 U.S.C. 154(b) by 0 days.

(21) Appl. No.: 17/957,520

(22) Filed: Sep. 30, 2022

(65) Prior Publication Data

US 2023/0107750 A1 Apr. 6, 2023

(30) Foreign Application Priority Data

Oct. 1, 2021 (FR) ...................................... 2110436

(51) Int. Cl.
*B60J 5/10* (2006.01)
(52) U.S. Cl.
CPC ..................................... *B60J 5/107* (2013.01)
(58) Field of Classification Search
CPC .................................. B60J 5/107; B60J 5/101
USPC ................................................. 296/56, 146.8
See application file for complete search history.

(56) References Cited

U.S. PATENT DOCUMENTS

| | | | |
|---|---|---|---|
| 7,399,022 B2 * | 7/2008 | Kalmbach | B60J 5/10 296/146.7 |
| 8,646,829 B2 * | 2/2014 | Crane | B60J 5/101 296/187.03 |
| 9,931,914 B2 * | 4/2018 | Kawashima | B60R 13/105 |
| 9,981,534 B2 * | 5/2018 | Dassen | B60J 5/10 |
| 10,046,624 B2 * | 8/2018 | Motohashi | B60J 5/107 |
| 10,220,688 B2 | 3/2019 | Demange et al. | |
| 10,272,750 B2 * | 4/2019 | Costa | B62D 35/007 |
| 10,384,520 B2 * | 8/2019 | Kuntze | B60J 5/101 |
| 10,479,415 B2 * | 11/2019 | Adachi | B60J 5/101 |
| 10,752,097 B2 * | 8/2020 | Adachi | B60J 5/101 |
| 11,198,477 B2 * | 12/2021 | Coudron | B60J 5/0481 |
| 11,273,771 B2 * | 3/2022 | Leterrier | B60J 5/101 |

(Continued)

FOREIGN PATENT DOCUMENTS

| | | | | |
|---|---|---|---|---|
| DE | 102004056141 A1 * | 6/2006 | | B60J 5/101 |
| DE | 102020214355 A1 | 5/2021 | | |

(Continued)

*Primary Examiner* — Jason S Morrow
(74) *Attorney, Agent, or Firm* — Dilworth IP, LLC (57) ABSTRACT

A motor vehicle opening panel including an inner panel, preferably made of plastic material, provided with an upper part in which a first opening is made that is intended to accommodate a rear window, and an outer skin, at least partially made of plastic material, attached to the inner panel, comprising an inner surface located opposite an outer surface of the inner panel. The opening panel further includes a support plate for at least one equipment item covered by the outer skin. The inner surface of the outer skin is attached directly to the support plate 4 in a sealed manner. The plate is arranged inside an inner volume delimited by the outer surface of the inner panel and by the inner surface of the outer skin. The outer skin is attached directly and fastened removably to the inner panel or to the plate.

12 Claims, 6 Drawing Sheets

(56) References Cited

U.S. PATENT DOCUMENTS

2013/0182450 A1    7/2013   Buisson
2018/0186220 A1    7/2018   Leterrier et al.
2023/0108708 A1*   4/2023   Leterrier ................. B60J 5/107
                                                               49/70

FOREIGN PATENT DOCUMENTS

FR           3038575 A1     1/2017
FR           3117944 A1 *   6/2022
WO       2012013811 A1     2/2012
WO       2016189237 A1    12/2016
WO   WO-2017203120 A1 * 11/2017  ............ B60J 5/0455
WO       2022136276 A1     6/2022

* cited by examiner

MOTOR VEHICLE OPENING PANEL PROVIDED WITH AN EQUIPMENT SUPPORT PLATE AND A REMOVABLE SKIN

FIELD OF THE INVENTION

The invention relates to the field of motor vehicle bodywork parts, more specifically opening panels, such as tailgates or side doors, and in particular the integration of equipment installed there.

BACKGROUND OF THE INVENTION

For example, a motor vehicle tailgate generally comprises an outer panel (also called outer skin) applied to an inner panel, or frame. The inner panel is provided with a first opening in the upper part of the tailgate intended to accommodate a rear window. In the lower part of the tailgate, this inner panel is usually provided with small recesses allowing local passage for the attachment of components.

On most vehicles, motor vehicle tailgates incorporate, in the lower part of the tailgate, side rear signaling lights, such as brake lights, generally a left light and a right light located symmetrically on either side of the tailgate. Preferably, these two lights are located as much as possible along the side edges of the tailgate in order, in the closed position of the tailgate, to face the additional rear light located on the body of the vehicle. Such lights are currently manufactured by suppliers in the form of lighting units or optical units. Such optical units comprise a rear part, or casing, in which the lighting device is arranged, as well as a window, also called glass, allowing light to pass when the light is in operation. These two side lights are added and mounted on the tailgate on and by its outer face, which has many drawbacks.

First of all, it is necessary to provide a sealed glass with respect to the optical casing in order to protect the lighting device. In addition, an operator should mount the two side lights at two separate locations on the tailgate, connect the electrical harnesses to them, and seal the assembly to prevent runoff water from entering the volume delimited by the inner panel and the outer skin of the tailgate, passing between the light and the outer skin, which presents practical difficulties.

Another drawback lies in the fact that the side lights thus added appear as additions and do not exhibit any apparent continuity with the rest of the tailgate, which is detrimental to its esthetics. Indeed, a trend among car manufacturers is to ensure that the various exterior surfaces of the vehicle are flush with each other and appear seamless. In certain configurations, lighted elements can even remain partially or totally invisible from the outside, for example when they are not activated ("hidden until lit").

Finally, the added side lights have the disadvantage of not being easily removable. In fact, most of the time, the outer skin of the tailgate is permanently bonded to the inner panel to ensure the seal between these two elements. It therefore becomes necessary, in order to access the side lights, to pass through the interior of the vehicle by means of openings made for this purpose in the inner panel. This has several drawbacks. Making holes reduces the rigidity of the panel, especially since the holes must be large enough to be able to remove the lights and their connectors. In addition, they must be able to be closed so as to be hidden and/or to avoid the insertion of liquid using specific covers, which complicates the design of the tailgate.

SUMMARY OF THE INVENTION

The object of the invention is in particular to remedy these drawbacks by providing a motor vehicle opening panel that makes it possible to integrate equipment in its lower part in a sealed manner, and that makes it possible to improve the esthetics of the vehicle, while also providing easy access to this equipment.

To this end, the invention relates to a motor vehicle opening panel comprising:
- an inner panel, preferably made of plastic material, provided with an upper part in which a first opening is made that is intended to accommodate a rear window, and
- an outer skin, at least partially made of plastic material, applied to the inner panel, comprising an inner surface located opposite an outer surface of the inner panel.

The opening panel according to the invention further comprises a support plate for at least one equipment item covered by the outer skin, the inner surface of the outer skin being applied directly to the support plate in a sealed manner, said plate being arranged inside a volume delimited, on the one hand, by the outer surface of an inner panel and, on the other hand, by the inner surface of the outer skin, the outer skin being applied directly and fastened removably to the inner panel or to the support plate.

"Outer surface of the inner panel" refers to the surface facing the outside of the vehicle. The outer surface is opposed to the inner surface, which itself faces toward the passenger compartment.

A first element is understood to be "applied to" a second element when the first element is arranged facing the second element, covering it at least in part, whether it is fastened thereto or not.

A first element is understood to be "applied directly to" a second element when the first element is attached to the second element and any fastening means that link the two elements are arranged directly on these two elements, without an intermediate structural part such as another panel, for example. In addition, according to this definition, a first element is directly applied to a second element, including if fastening means (screw, washer, glue, etc.), sealing means (seal, foam, etc.), decorative means (film, paint, etc.) and/or insulation means (foam, etc.) are placed between the first element and the second element.

Owing to the presence of an equipment support plate that is covered by the outer skin and to which the outer skin is attached in a sealed manner, but which is also arranged inside a volume delimited, on the one hand, by the outer surface of an inner panel and, on the other hand, by the inner surface of the outer skin, it is possible to have lighting, communication or driving assistance devices carried via the equipment support plate rather than applying them to the outer face of the outer skin of the opening panel. This facilitates their implementation within the opening panel in the desired position for each equipment item, since they are assembled beforehand on the plate to which the outer skin is applied.

Thus, the esthetics of the vehicle are improved, since the equipment does not appear as additions and does not have any apparent discontinuity with the rest of the opening panel.

In addition, it is also possible to ensure that the equipment carried by the support plate is concealed by the outer skin, including, in the case of a tailgate, the rear lights, for example when they are not lit. "Concealed by the outer skin" means that the equipment is not obviously visible to a user.

In addition, the fact that the outer skin is attached directly in a sealed manner to the equipment support plate makes it possible to create a specific "dry zone" for the equipment carried by the support plate. The term "dry zone" is understood here to mean a closed volume, sealed with respect to the outside environment. Thus, all the equipment carried by the support plate is sealed off from the outside environment via the sealed connection obtained between the support plate and the outer skin. This is much easier than sealing around each equipment item individually or sealing each equipment item, such as with lighting units. This ultimately preserves this equipment and therefore ensures its proper functioning.

Finally, the fact that the outer skin is directly attached and directly removably fastened to the inner panel and/or to the support plate makes it particularly easy to repair and/or replace the equipment carried by the plate. Indeed, one need only detach the skin from the rest of the tailgate to access the equipment and all its connections.

Advantageously, in order to easily access the equipment carried by the support plate, the outer skin is configured so as to be able to be detached from the inner panel and/or from the plate and then to be moved away from it toward the outside of the vehicle. It is in fact no longer necessary to remove the equipment from the vehicle through the inner panel from inside the vehicle, which greatly facilitates its maintenance, its replacement and, in general, after-sales service.

According to a preferred embodiment of the invention, the inner surface of the outer skin is applied directly and fastened to the outer surface of the inner panel so that the outer skin can be detached from the inner panel in a removable manner, for example by screwing. This makes it easier to remove the outer skin, since there is no intermediate part to remove between the inner panel and the support plate.

According to a particular embodiment of the invention, the equipment support plate comprises a niche whose walls delimit a volume in which said at least one equipment item is inserted and a peripheral rim extending the walls of the niche. The volume delimited by the niche can thus form a "dry zone" for the equipment items.

According to a particular embodiment of the invention, the equipment support plate is applied directly and fastened to the outer surface of the inner panel by gluing.

According to another embodiment of the invention, the equipment support plate is applied directly and fastened to the outer surface of the inner panel in a removable manner, for example by screwing.

In order to ensure a seal in the volume delimited by the niche of the support plate and therefore to protect the equipment item that is located in this volume, a seal is placed between the support plate and the inner surface of the outer skin.

Preferably, the equipment support plate comprises a device emitting and/or receiving electromagnetic radiation and the outer skin comprises, opposite the device emitting and/or receiving electromagnetic radiation, a transmission zone, made of plastic, that is at least partially transparent to said electromagnetic radiation. It is thus possible to take advantage of the support plate to arrange radiation-emitting devices in order to establish, for example, a continuous light signature over the entire width of the tailgate if so desired, or even to integrate driving assistance devices, such as radars (which generally emit electromagnetic radiation between 20 and 80 GHz), lidars (which generally emit electromagnetic radiation belonging to the infrared spectrum) or reversing cameras. Finally, it can also be communication equipment, such as screens or antennas. In general, this equipment can be any device requiring wave transparency.

According to a particular embodiment of the invention, the electromagnetic radiation belongs to the visible spectrum.

According to another embodiment of the invention, the electromagnetic radiation belongs to the non-visible spectrum.

In order to easily access the equipment carried by the support plate without having to detach the outer skin from the support plate, the support plate comprises at least one access orifice to one of the equipment items carried by the support plate, and preferably at least one closure member for closing said access orifice.

According to a particular embodiment of the invention, the support plate is in one piece.

According to another embodiment of the invention, the support plate is made in several parts assembled together. Provision may in particular be made for it to be provided with an orifice covered by removable closure means allowing access to the equipment.

Preferably, in order in particular to be able to ensure transparency of the skin to various electromagnetic radiation as required, the outer skin is made of one of the following materials:
polypropylene (PP);
polyamide (PA);
polyethylene (PE);
acrylonitrile butadiene styrene (ABS);
polyethylene terephthalate (PET);
polystyrene (PS);
polycarbonate (PC);
polymethyl methacrylate (PMMA);
cyclo-olefin copolymer (COC);
as well as any combination of these materials.

According to another embodiment of the invention, the opening panel constitutes a tailgate or a side door.

BRIEF DESCRIPTION OF THE FIGURES

The invention will be better understood on reading the description that follows, in which the opening panel of the invention has been described in the form of a tailgate, which description is given solely by way of example and with reference to the appended drawings, in which.

DETAILED DESCRIPTION

FIGS. 1A to 4 show a motor vehicle tailgate 1 according to a first embodiment of the invention. The motor vehicle is not shown in the figures.

Figure 1A:
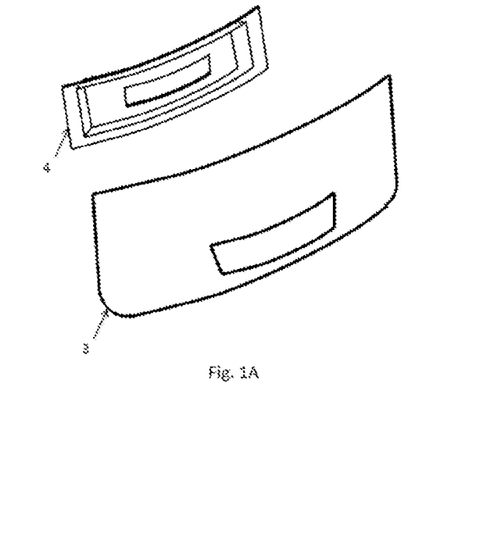
FIGS. 1A and 1B are schematic views (FIG. 1A exploded and 1B assembled) of an equipment support plate and an outer skin of a tailgate according to one embodiment of the invention.
Figure 1B:
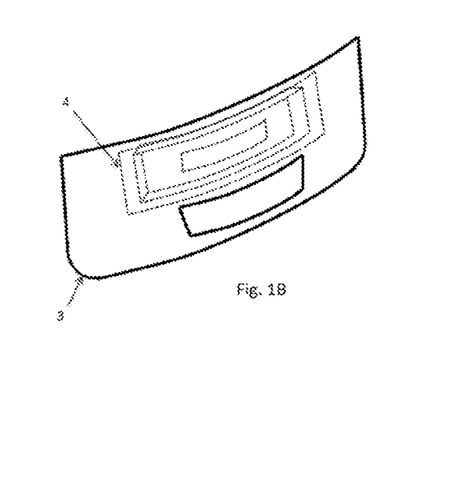
Figure 2:
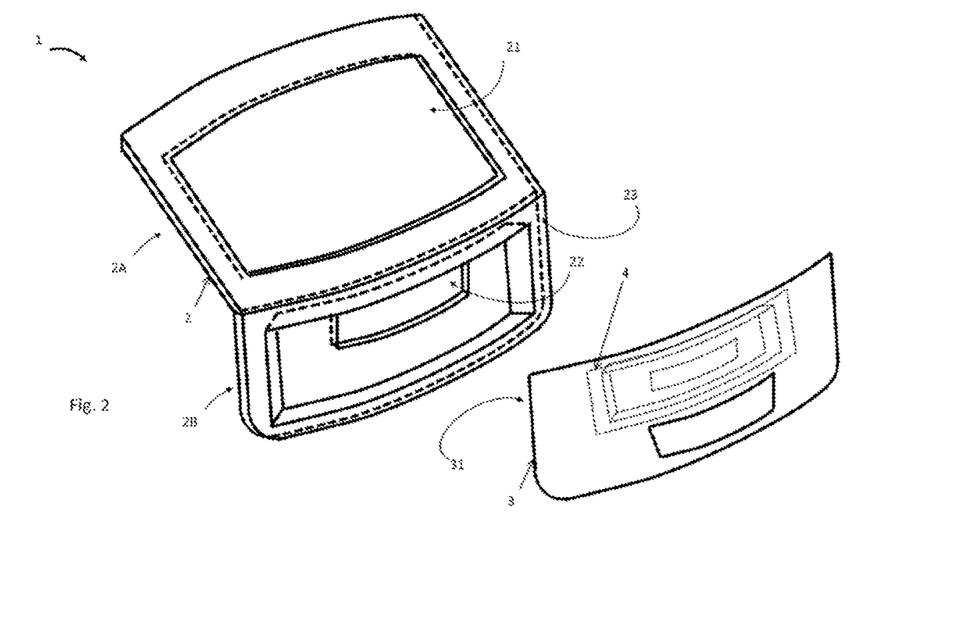
FIG. 2 is a schematic sectional view of a tailgate according to a first embodiment of the invention.
Figure 3:
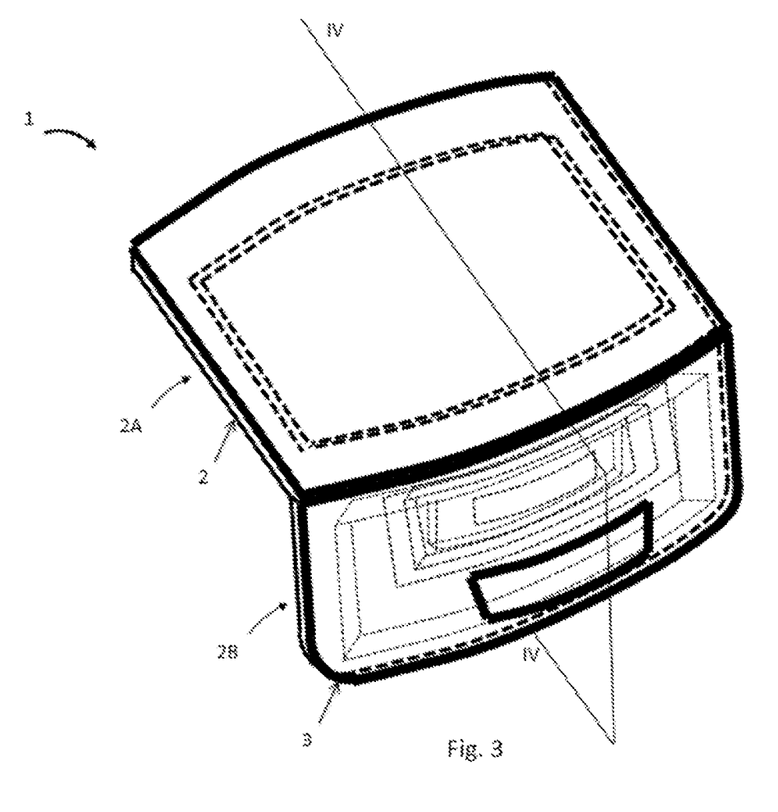
FIG. 3 is a schematic view of the tailgate of FIG. 2.

As can be seen in particular in FIG. 2, the tailgate 1 comprises an inner panel 2, preferably made of plastic material, provided with an upper part 2A in which a first opening 21 is made that is intended to accommodate a rear window 7. The rear window 7 is in particular fastened to the inner panel 2 via a bead of glue 8.

The tailgate 1 also comprises an outer skin 3, at least partially made of plastic material, attached to the inner panel 2, comprising an inner surface 31 located opposite an outer surface 23 of the inner panel 2. "Outer surface 23 of the inner panel" means the surface facing the outside of the vehicle. The outer surface 23 is opposite an inner surface 24 of the outer panel, which itself faces the passenger compartment.

Figure 4:
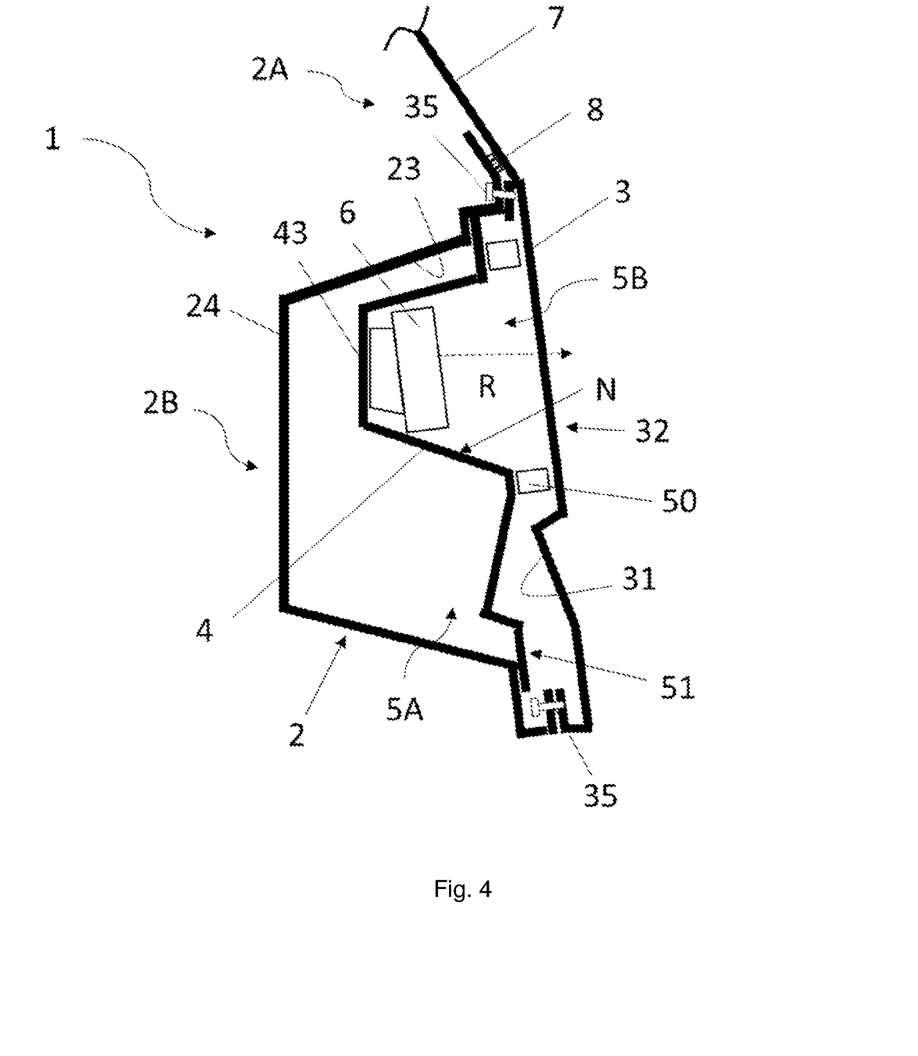
FIG. 4 is a schematic section taken along section plane IV-IV of FIG. 3.

As can be seen in FIG. 4, the tailgate 1 further comprises a support plate 4 for at least one equipment item 6. The inner surface 31 of the outer skin 3 is applied directly to the support plate 4 in a sealed manner.

The outer skin 3 is applied directly to the inner panel 2 in a removable manner.

More precisely, the outer skin 3 is configured so that it can be detached from the inner panel 2 from inside the vehicle (left of FIGS. 4 and 5) toward the outside (right of FIGS. 4 and 5) of the vehicle, as will be explained later.

The support plate 4 is applied directly to the inner panel 2. For example, the support plate 4 can be glued to the inner panel 2.

More specifically, in the example shown in the figures, the support plate 4 is applied directly to the outer surface 23 of the inner panel 2 and is fastened there, here by gluing (the glue is not visible in the figures).

The support plate 4 comprises a niche N whose walls delimit a volume 5B in which said at least one equipment item 6 is housed, as well as a peripheral rim 51 extending the walls of the niche N.

Figure 5:
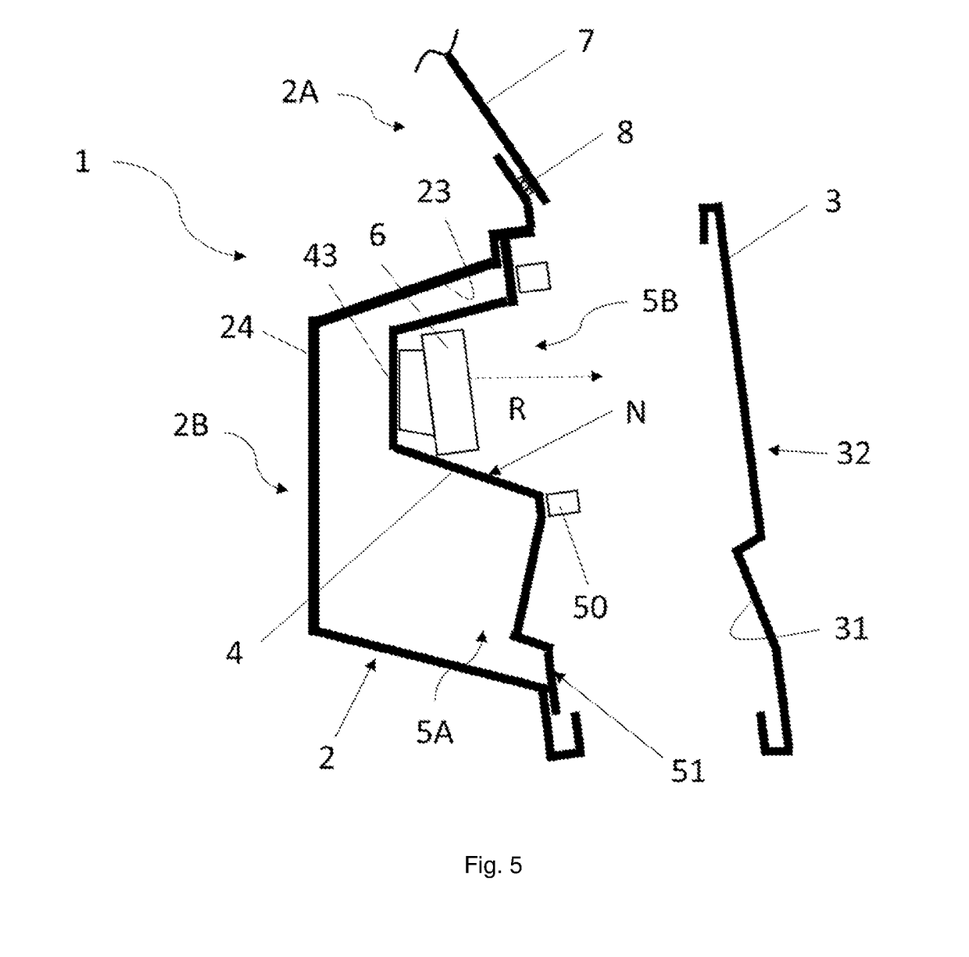
FIG. 5 is a schematic section of the equipment plate and the equipment item of FIG. 4, the skin having been removed from the tailgate.

The sealing of the volume 5B is ensured by means of a peripheral seal 50 arranged between the support plate 4 and the inner surface of the outer skin 3. It may in particular be a foam seal compressed between the peripheral rim 51 of the support plate 4 and the inner surface 31 of the outer skin 3. The seal 50 may in particular be carried by the support plate 4 once the outer skin 3 has been detached therefrom as illustrated in FIG. 5. Alternatively, the seal 50 may be carried by the outer skin 3.

The plate 4 is fastened to the outer surface 23 of the inner panel 2. To this end, the peripheral rim 51 of the plate 4 is assembled to the outer surface 23 of the inner panel, for example by gluing. Other fastening means can be envisaged. The fastening, such as gluing, can also be carried out in a zone other than the peripheral rim of the plate 4.

In a variant not shown, the support plate 4 can be removably assembled to the outer surface 23 of the inner panel 2, in particular using screws placed on the rim 51. The term "removable" means a fastening means that can be reversed several times without altering the parts, unlike gluing, for example.

However, these screws could be arranged in places other than the rim 51. In particular, in yet another variant that is not shown, the fastening of the support plate 4 to the outer surface 23 of the inner panel 2 can be carried out at one of the walls of the niche N, outside the rim 51.

It is of course possible to envisage fastening means other than screws, such as clips, for example, as long as they allow removal of the support plate 4 from the inner panel 2 in a removable manner.

A seal (not visible in the figures) can also be placed between the peripheral rim 51 and the outer surface 23 of the inner panel. It may be for example a foam seal compressed between the peripheral rim 51 and the outer surface 23 of the inner panel.

The outer skin 3 is fastened, via its inner surface 31, to the outer surface 3 of the inner panel 3. Here, it is connected thereto by screws 35. In the embodiment illustrated in FIGS. 4 and 5, the screws 35 are arranged on a rim of the outer skin 2 coming into contact with the outer surface 23 of the inner panel 2. However, this rim is optional and the screws 35 can be placed at various locations on the outer surface 23 of the inner panel 2 and the inner surface 31 of the outer skin 3.

The outer skin 3 may be attached to the outer surface 23 of the inner panel 2 in a sealed manner, for example using a seal placed between the inner surface 31 of the outer skin 3 and the outer surface 23 of the inner panel 2 (the seal is not visible in the figures).

In the embodiment shown in the figures, it is necessary, in order to detach the outer skin 3 from the inner panel 2, to unscrew the screws 35 from inside the vehicle (passenger compartment side). Then, one can remove the outer skin 3 of the inner panel 2 from outside the vehicle and separate it from the rest of the vehicle, as shown in FIG. 5 in particular.

The support plate 4 comprises one or more equipment items 6, only one of which is visible in the illustrated sections 4 and 5. Of course, these can be different from each other. It may, for example, be one or more light devices that emit electromagnetic radiation R in the visible spectrum. This electromagnetic radiation is shown schematically by a dotted arrow in FIGS. 4 and 5. These light devices can be distributed over all or part of the width of the support plate 4 in order to establish the desired light signature. Thus, it is possible to obtain a light signature with a continuous appearance over the entire width of the tailgate if so desired.

The equipment item(s) 6 can also be driving assistance devices, such as for example radars (which generally emit electromagnetic radiation between 20 and 80 GHz), lidars (which generally emit electromagnetic radiation belonging to the infrared spectrum) or reversing cameras. Finally, it can also be communication equipment, such as information screens or antennas. In general, the equipment item(s) 6 can be any device requiring wave transparency.

The zone of the outer skin 3 located opposite the equipment item 6 is a transmission zone 32 made of plastic material at least partially transparent to the electromagnetic radiation of the equipment, in the case where the latter emits and/or receives electromagnetic radiation. "At least transparent to electromagnetic radiation" means that this transmission zone 32 allows the passage of a quantity of electromagnetic waves sufficient for the equipment to be able to fulfill its dedicated function correctly and continuously. In the case of a light device, for example, this means that the transmission zone 32 allows the light rays emitted by the device to pass so that they can be seen by an observer outside the vehicle.

The outer skin 3 is preferably made of one of the following materials:
- polypropylene (PP);
- polyamide (PA);
- polyethylene (PE);
- acrylonitrile butadiene styrene (ABS);
- polyethylene terephthalate (PET);
- polystyrene (PS);
- polycarbonate (PC);
- polymethyl methacrylate (PMMA);
- cyclo-olefin copolymer (COC);

as well as any combination of these materials.

The support plate 4 can be in one piece, which simplifies its manufacture and avoids the steps of assembling several elements on the outer skin 3. Alternatively, the support plate 4 can be made of several parts assembled together either before being introduced into the inner volume 5A, or after having been introduced into the inner volume 5A.

Figure 6:
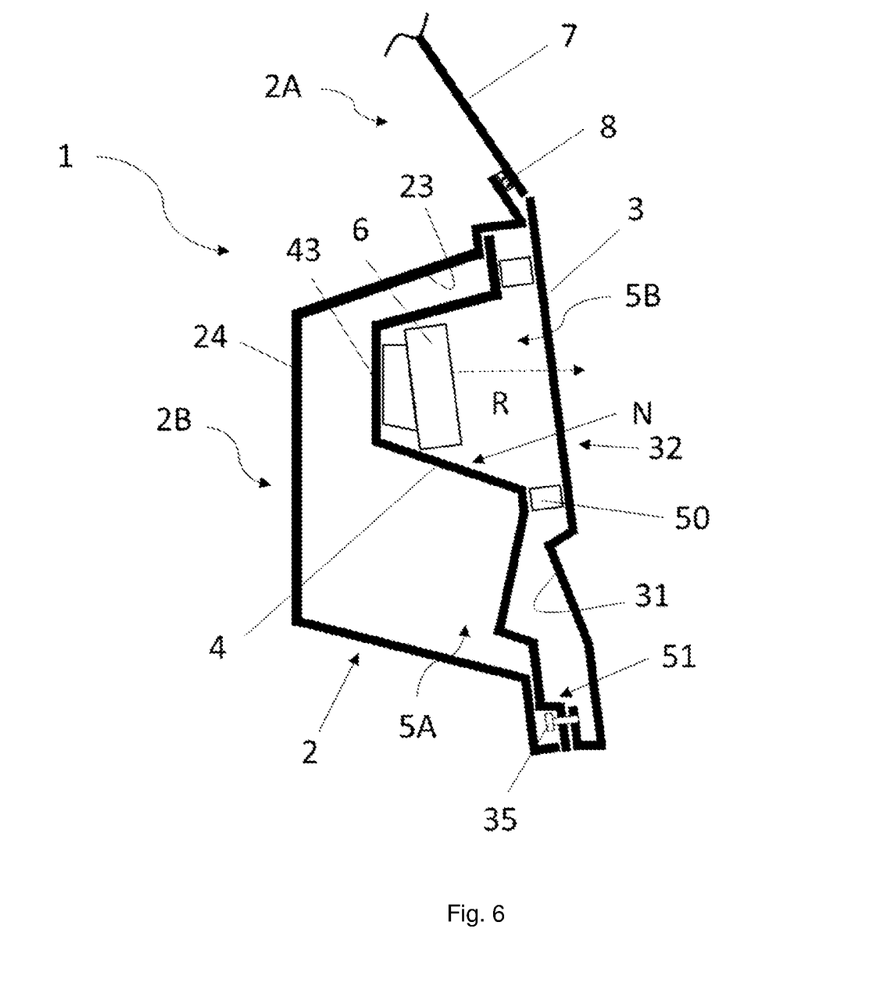
FIG. 6 is a view similar to FIG. 4 of a tailgate according to a second embodiment.
Figure 7:
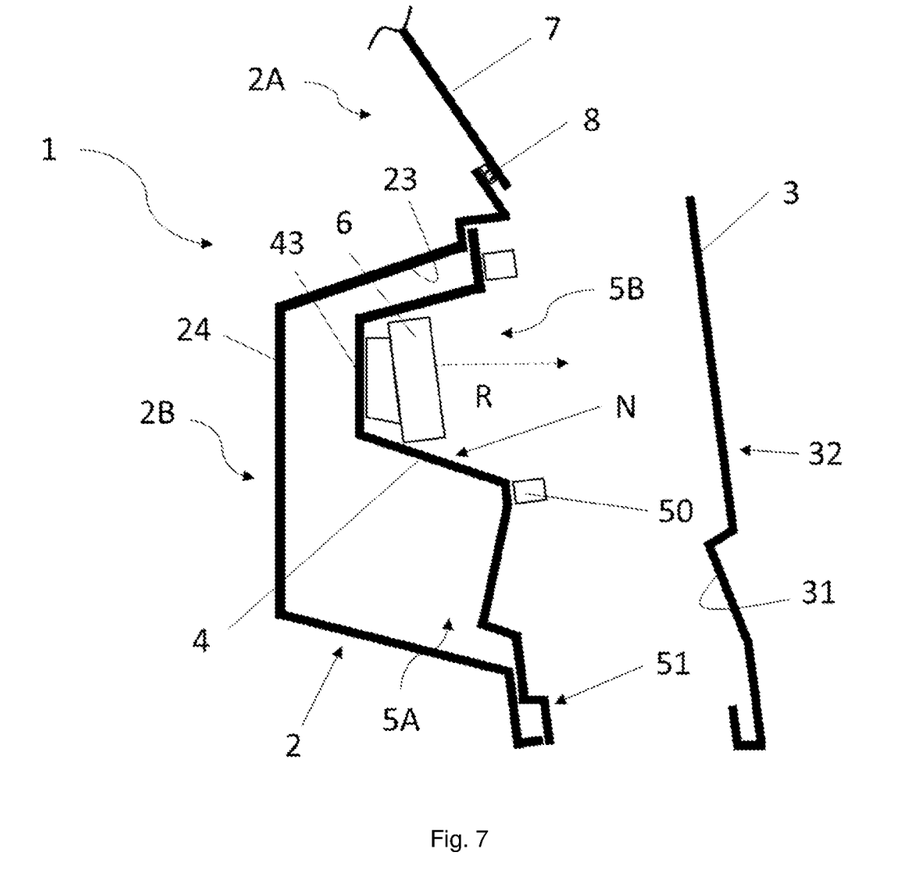
FIG. 7 is a view similar to FIG. 5 of a tailgate according to a second embodiment.

In a second embodiment illustrated in FIGS. 6 and 7, the outer skin 3 is directly attached and removably fastened to the support plate 4 rather than to the inner panel 2. More specifically, the outer skin 3 is fastened to an outer surface of the support plate 4, here using screws 35. For example, the fastening of the outer skin 3 is done at the peripheral rim of the support plate 4. Naturally, other fastening means, such as clips, can be envisaged.

The invention is not limited to the embodiments described here, and other embodiments will become clearly apparent to a person skilled in the art. It is possible in particular to envisage any combination of the embodiments presented.

LIST OF REFERENCES

1: tailgate
2: inner panel
2A: upper part of the inner panel
2B: lower part of the inner panel
3: outer skin
4: equipment support plate
5A: inner volume of the opening panel
5B: inner volume of the plate
6: equipment item of the plate
7: rear window
8: bead of glue of the rear window
23: outer surface of the inner panel
24: inner surface of the inner panel
31: inner surface of outer skin
32: transmission zone
35: screws between the support plate and the inner panel
42: plate access orifice
43: closure member
50: seal
51: rim of the plate
N: niche of the support plate
R: electromagnetic radiation

The invention claimed is:

1. A motor vehicle opening panel, comprising:
an inner panel, made of plastic material, provided with an upper part in which a first opening is made that is intended to accommodate a rear window, and
an outer skin, at least partially made of plastic material, attached to the inner panel, comprising an inner surface located opposite an outer surface of the inner panel, characterized in that it further comprises a support plate for at least one equipment item covered by the outer skin, the inner surface of the outer skin being attached directly to the support plate in a sealed manner, said plate being arranged inside a volume delimited, on the one hand, by the outer surface of the inner panel and, on the other hand, by the inner surface of the outer skin, the outer skin being applied directly and fastened removably to the inner panel or to the support plate.

2. The motor vehicle opening panel according to claim 1, wherein the outer skin is configured so as to be able to be detached from the inner panel or from the plate, then to be moved away from it toward an outside of the vehicle.

3. The motor vehicle opening panel according to claim 1, wherein the inner surface of the outer skin is applied directly and fastened to the outer surface of the inner panel or to the plate so that the outer skin can be detached from the inner panel in a removable manner.

4. The motor vehicle opening panel according to claim 3, wherein the outer skin is fastened to the outer surface of the inner panel by screwing.

5. The motor vehicle opening panel according to claim 1, wherein the outer skin is attached to an outer surface of the inner panel in a sealed manner.

6. The motor vehicle opening panel according to claim 5, wherein the outer skin is attached to the outer surface of the inner panel using a seal placed between the inner surface of the outer skin and the outer surface of the inner panel.

7. The motor vehicle opening panel according to claim 1, wherein the equipment support plate comprises a niche whose walls delimit a volume in which said at least one equipment item is inserted and a peripheral rim extending the walls of the niche.

8. The motor vehicle opening panel according to claim 1, wherein the equipment support plate is applied directly and fastened to the outer surface of the inner panel by gluing.

9. The motor vehicle opening panel according to claim 1, wherein the equipment support plate is applied directly and fastened to the outer surface of the inner panel in a removable manner.

10. The motor vehicle opening panel according to claim 9, wherein the equipment support plate is screwed to the outer surface of the inner panel.

11. The motor vehicle opening panel according to claim 1, wherein a seal is placed between the support plate and the inner surface of the outer skin.

12. The motor vehicle opening panel according to claim 1, wherein the equipment support plate comprises a device emitting and/or receiving electromagnetic radiation and the outer skin comprises, opposite the device emitting and/or receiving electromagnetic radiation, a transmission zone, made of plastic, that is at least partially transparent to said electromagnetic radiation.

* * * * *